(12) United States Patent
Tenginakai et al.

(10) Patent No.: US 9,755,900 B2
(45) Date of Patent: Sep. 5, 2017

(54) MANAGING CONFIGURATION UPDATES

(71) Applicant: Amazon Technologies, Inc., Reno, NV (US)

(72) Inventors: Shivaraj Tenginakai, Mercer Island, WA (US); Rachit Chawla, Kirkland, WA (US); Colin John Whittaker, Dublin (IE); Rajkumar Haridoss, Seattle, WA (US); Raghavendra Vijayanarasimhan Narasimhan, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 190 days.

(21) Appl. No.: 13/794,660

(22) Filed: Mar. 11, 2013

(65) Prior Publication Data
US 2014/0258479 A1 Sep. 11, 2014

(51) Int. Cl.
*G06F 15/177* (2006.01)
*H04L 12/24* (2006.01)

(52) U.S. Cl.
CPC ........ *H04L 41/082* (2013.01); *H04L 41/0869* (2013.01); *H04L 41/0889* (2013.01)

(58) Field of Classification Search
CPC .......................... H04L 41/082; H04L 41/0889; H04L 41/0869
See application file for complete search history.

(56) References Cited

U.S. PATENT DOCUMENTS

| 8,214,653 | B1 | 7/2012 | Marr et al. |
| 8,943,490 | B1 * | 1/2015 | Jain et al. ................ 717/168 |
| 2003/0176163 | A1 | 9/2003 | Gosewehr |
| 2004/0042396 | A1 | 3/2004 | Brown et al. |
| 2004/0042402 | A1 | 3/2004 | Galand et al. |

(Continued)

FOREIGN PATENT DOCUMENTS

| EP | 2974154 | 1/2016 |
| WO | WO0114989 A1 * | 3/2001 |

OTHER PUBLICATIONS

PCT International Search Report and Written Opinion for PCT/US2014/020917, date of mailing Jun. 23, 2014, 12 pages.

(Continued)

*Primary Examiner* — Padma Mundur
(74) *Attorney, Agent, or Firm* — Hogan Lovells US LLP

(57) ABSTRACT

Approaches are described for managing configuration information updates, or other information in a data center, shared resource environment, or other such electronic environment. A management component is provided that can manage distribution of configuration information, operating system (OS) images, authentication data, or other such information for host machines, servers, or other such devices in a network environment. The management component can further perform a number of actions when deploying configuration information updates, such as performing one or more checks to verify the health of a target switch, deactivating the target switch, shifting traffic to and from the target switch, updating a current configuration of the target switch, verifying the target switch's health after the configuration changes, bringing the target switch back in service, among others.

24 Claims, 6 Drawing Sheets

(56) References Cited

U.S. PATENT DOCUMENTS

| | | | |
|---|---|---|---|
| 2004/0260718 A1* | 12/2004 | Fedorov | 707/102 |
| 2008/0310422 A1 | 12/2008 | Booth et al. | |
| 2009/0245137 A1 | 10/2009 | Hares | |
| 2010/0214949 A1 | 8/2010 | Smith et al. | |
| 2011/0103259 A1 | 5/2011 | Aybay et al. | |
| 2011/0292947 A1 | 12/2011 | Vobbilisetty | |
| 2012/0016973 A1 | 1/2012 | Haris et al. | |
| 2012/0177195 A1 | 7/2012 | Elliott et al. | |
| 2012/0251113 A1* | 10/2012 | Hajduczenia et al. | 398/66 |
| 2012/0263187 A1 | 10/2012 | Belanger et al. | |
| 2012/0311116 A1 | 12/2012 | Jalan | |
| 2014/0006862 A1* | 1/2014 | Jain et al. | 714/26 |

OTHER PUBLICATIONS

Casado, Martin et al., "Ripcord: A Modular Platform for Data Center Networking", Electrical Engineering and Computer Sciences, University of California at Berkeley, Jun. 7, 2010, http://www.eecs.berkeley.edu/Pubs/TechRpts/2010/EECS-2010-93.html, 15 pages.

PCT International Preliminary Report on Patentability for PCT/US2014/020917, date of mailing Sep. 24, 2015, 11 pages.

"Search Report dated Feb. 8, 2016" received in European Application No. 14778061.30.

"Extended Search Report dated Apr. 11, 2016" received in European Application No. 14778061.30.

* cited by examiner

MANAGING CONFIGURATION UPDATES

BACKGROUND

As an increasing number of applications and services are being made available over networks such as the Internet, and increasingly utilizing sources such as networked data centers, an increasing number of content, application, and/or service providers are turning to technologies such as cloud computing and Web services. In such environments, the hardware and/or software used to provide access to data and/or electronic resources typically needs to be scalable to meet the needs of various users at any given time. A user or customer typically will rent, lease, or otherwise pay for access to resources, and thus does not have to purchase and maintain the hardware and/or software to provide access to these resources.

In some cases, a provider of such electronic resources might need to update the resources, such as the configuration, operating system (OS), or other information of the resources. However, in a shared computing environment, such as a cloud computing environment where many resources need to be updated, the opportunities for error increase, and any one error can have a significant impact on the availability of data and/or the electronic resources provided by the shared computing environment. For example, shifting network traffic from one device to another in order to upload a new configuration to a device, or maintaining historical versions of configuration, among others, has to be performed for thousands of devices in dozens of data centers, and an error can impact a user's access to any one of the electronic resources. This can be frustrating or at least inconvenient for a user, particularly where the user relies on the impacted resources.

BRIEF DESCRIPTION OF THE DRAWINGS

Various embodiments in accordance with the present disclosure will be described with reference to the drawings, in which.

DETAILED DESCRIPTION

Figure 1:
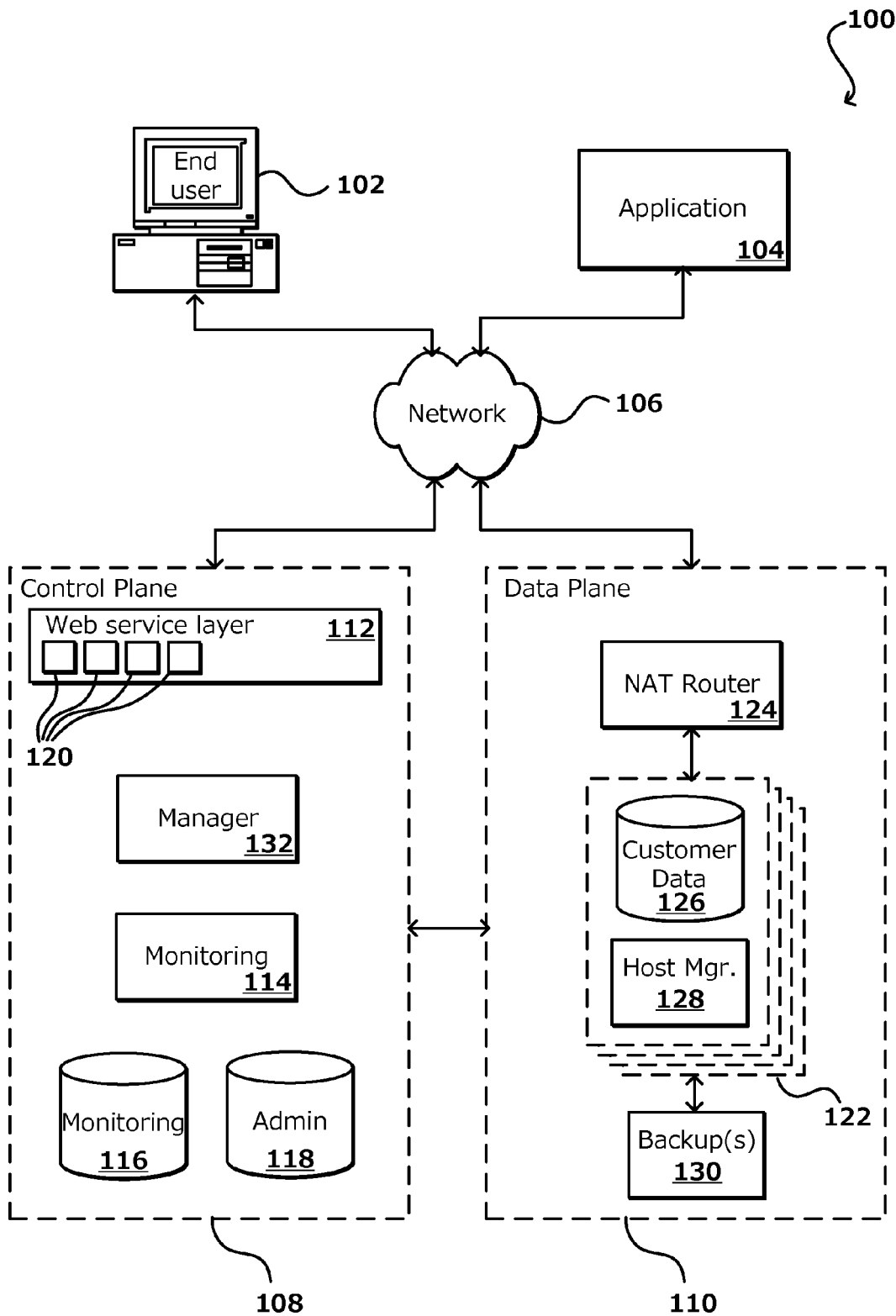
FIG. 1 illustrates an environment for providing access to various resources that can be used in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the aforementioned and other deficiencies experienced in conventional approaches to managing configuration information updates, or other information deployments in a data center, shared resource environment or other such electronic environment. In particular, a management component or other control component can manage distribution of configuration information, operating system (OS) images, authentication data, or other information for host machines, servers, or other such devices in a network environment. The management component can perform a number of actions when deploying configuration information, configuration information updates, or other information, such as one or more checks to verify a health of a target switch (such as whether the switch is receiving and communicating network traffic), deactivating the target switch, shifting traffic to and from the target switch, updating a current configuration of the target switch, verifying the target switch's health after the configuration changes or other such post deployment check, bringing the target switch back in service, among others.

In various embodiments, the distribution of configuration updates and/or other such information can occur over a highly connected network, such as a high radix aggregation fabric, which can utilize devices such as high-throughput commodity switches (i.e., switches or routers with relatively small buffers compared to the amount of throughput). The network and the host devices can be provided and/or utilized in any appropriate electronic environment, such as a data center offering in a in a shared resource or other multi-tenant environment, as well as any non-virtualized or otherwise private data center. Although various embodiments described herein are discussed in regard to a particular network topology (such as the one described in FIG. 2), it should be understood that embodiments described herein for managing configuration information updates or other information deployments can apply to any network topology. That is, in accordance with embodiments described herein, a management system or any control system can be used to automatically manage configuration information updates or other information deployments to any network topology. In still further embodiments, the management system can be provided as a service that can be used to remotely manage configuration information updates or other information deployments in a customer's network environment, while in still other embodiments, the management system can be provided to, and included as part of a customer's network environment, e.g., as a management system component or other such control component, that can be used to manage configuration information updates or other information deployments in accordance with embodiments described herein. In any situation, the management system can be used to sequentially, or concurrently, schedule and deploy configuration information, configuration information updates or other information, to any networked environment.

Systems and methods in accordance with various embodiments provide at least one resource access gateway, or control plane 108, either as part of a data environment or in a path between an end user device 102 and a data plane 110, as illustrated in the example environment 100 of FIG. 1. A control plane can enable users and applications to access shared and/or dedicated resources, offered by one or more resource providers, while allowing customers, administrators, or other authorized users to allocate at least some of these resources to various users, clients, or applications and ensure adherence to those allocations. A user then can perform tasks such as storing, processing, and querying relational data sets in a "cloud" of these resources. Guest users can also obtain access to resources to perform any appropriate functionality, such as to render and/or serve streaming media or perform any of a number of other such operations. While this example is discussed with respect to the Internet, Web services, and Internet-based technology, it should be understood that aspects of the various embodiments can be used with any appropriate resources or services available or offered over a network in an electronic environment. Further, while various examples are presented with respect to shared and/or dedicated access to disk, data storage, hosts, and peripheral devices, it should be understood that any appropriate resource can be used within the scope of the various embodiments for any appropriate purpose, and any appropriate parameter can be monitored and used to adjust access or usage of such a resource by any or all of the respective users.

In the example of FIG. 1, a computing device 102 for an end user is shown to be able to make calls through at least one appropriate network 106, such as the Internet or a cellular network, for example, to a control plane 108 (or other such access layer) to perform a task such as to obtain access to a specified resource or resource type. While an end user computing device 102 and a third party application 104 are used for purposes of explanation, it should be understood that any appropriate user, application, service, device, component, or resource can access the interface(s) and components of the connection component and data environment as appropriate in the various embodiments. Further, while certain components are grouped into a data "plane," it should be understood that this can refer to an actual or virtual separation of at least some resources (e.g., hardware and/or software) used to provide the respective functionality. Further, the control plane can be considered to be part of the data plane in certain embodiments. While a single control plane is shown in this embodiment, there can be multiple instances of control or access management components or services in other embodiments. A control plane can include any appropriate combination of hardware and/or software, such as at least one server configured with computer-executable instructions. The control plane also can include a set of APIs 120 (or other such interfaces) for receiving Web services calls or other such requests from across the network 106, which a Web services layer 112 can parse or otherwise analyze to determine the steps or actions needed to act on or process the call. For example, a Web service call might be received that includes a request to establish a connection to a data repository to execute a query for a user. In this example, the Web services layer can parse the request to determine the type of connection or access needed, the appropriate type(s) of resource needed, or other such aspects.

The control plane can include one or more resource allocation managers 132, or "cloud managers," each responsible for tasks such as validating the user or client associated with the request and obtaining or allocating access to the appropriate resource(s). Such a system can handle various types of request and establish various types of connection. Such a system also can handle requests for various types of resources, such as specific graphic processors or other types of hardware or hardware functionality, and can provide access to the appropriate resource(s). Components of the data plane 110, or the resource layer of the cloud, can perform the necessary tasks to provide the resource. For access to a data instance, for example, this can include tasks such as provisioning a data store instance, allocating a volume of off-instance persistent storage, attaching the persistent storage volume to the data store instance, and allocating and attaching a domain name, IP address or other address, port, interface, or identifier which the customer can use to access or otherwise connect to the data instance. For tasks such as obtaining processing of an instruction using a particular type of hardware, for example, the components of the data plane, in conjunction with the control plane, can perform actions such as provisioning a device for a user and providing shared and/or dedicated access to the resource for a period of time at a particular level of access to the resource. In this example, a user can be provided with the IP address and a port number to be used to access a resource. A user then can access the resource directly using the IP address and port, without having to access or go through the control plane 108.

The control plane 108 in this embodiment also includes at least one monitoring component 114. When a data instance or other resource is allocated, created, or otherwise made available in the data plane, information for the resource can be written to a data store accessible to the control plane, such as a monitoring data store 116. It should be understood that the monitoring data store can be a separate data store or a portion of another data store. A monitoring component 114 can access the information in the monitoring data store 116 to determine information such as the past usage of resources by various users, a current number or type of hardware threads or other computing resources being allocated to a user, and other such usage information. A monitoring component also can call into components of the data environment to determine information such as the number of active network connections for a given user in the data environment and aspects about the usage of each connection. A monitoring component can constantly monitor the usage of each resource by a user, client, etc., having an allocation provided through the connection manager. A monitoring component also can access information stored in an administrative ("Admin") or similar data store 118, which can store information such as the general allocation granted to a user, throttling or limiting information for a user, resource permissions for a user, or any other such information that can be specified and/or updated by an administrator or other such user.

In at least some embodiments, physical resources such as host servers can support one or more customer instances, which might each include a guest operating system (OS) and software that are to be executed on the host device. In an example where users request connections to various data instances, each instance 122 in the data environment can include at least one data store 126 and a host manager component 128 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager can be responsible for managing and/or performing tasks such as setting up the instances for a new repository, including setting up logical volumes and file systems, installing database binaries and seeds, and starting or stopping the repository. A host manager can monitor the health of the data store, monitoring the data store for error conditions such as I/O errors or data storage errors, and can restart the data store if necessary. A host manager can also perform and/or manage the installation of software patches and upgrades for the data store and/or operating system. A host manager also can collect relevant metrics, such as may relate to CPU, memory, and I/O usage.

The resource manager 132 can communicate periodically with each host manager 128 for which a connection has been established, or to an administration server or other component of the resource environment, to determine status information such as load, utilization levels of various resources, capacity, etc.

As discussed, once a resource is provisioned and a user is provided with an IP address derived from DNS mappings or other address or location, the user can communicate "directly" with components or resources of the data plane 110. An IP address derived from DNS mappings is beneficial in such a dynamic cloud environment, as instance or availability failures, for example, can be masked by programmatically remapping the IP address to any appropriate replacement instance for a use. Other dynamic mappings of addresses to physical substrate servers are possible, for example with the use of network address translation (NAT) or overlay networks. A request received from a user device 102 or application 104, for example, can be directed to a NAT router 124, or other appropriate component, which can direct the request to the actual resource 122 or host corresponding to the mapped address of the request. Such an approach allows for instances to be dynamically moved, updated, replicated, etc., without requiring the user or application to change the IP address or other address used to access the instance. In some cases, a resource 122 such as a data instance can have at least one backup instance 130, copy in persistent storage, etc.

As discussed, a resource can be shared among multiple users, clients, applications, etc., either concurrently or at different times, with varying levels of access or allocation. When a user has dedicated access to a machine or resource, the user might also have native or "bare metal" access to the resource for a period of time, depending on the type of access needed, and other such factors. This native-level access to remote hardware can be provided for resources such as servers, hosts, and cluster instances, for example. For resources such as cluster instances, customers may have native access to a subset of the hardware resources, such as may include peripheral devices connected using a component such as a peripheral component interconnect (PCI) bus. These peripheral devices can include network interface cards (NICs), graphics processing units (GPUs), and similar devices that would often be virtualized in a current cloud environment. In some cases, a customer might have full access to an entire machine, or groups of machines, including any or all devices incorporated therein. For a group of machines such as a rack of servers, a user might be granted substantially full access to the entire rack, including any switches or other devices or components provided as part of the rack.

Certain providers present such hardware resources as a virtualized abstraction, such that management of the physical hardware can occur in a "more trustworthy" execution context, and can provide additional benefits such as the ability to migrate customers to different resources without interrupting execution and, since customers or "guests" are not tied to specific hardware, the ability for vendors to compete to provide the best utility computing value for price. Also, fewer and simpler guest instance images can be used, as guests do not need a multitude of hardware-specific drivers.

Resource providers can, in at least some embodiments, provide for "partial" or "substantially" full access to a resource, such as a host server, by providing users with native access to the host hardware or specific devices, such as cards plugged into a peripheral control bus or similar datapath. In certain embodiments where specific levels of performance are an issue, technology such as an input/output memory management unit (I/O MMU) can be used to "assign" peripheral devices to guest operating systems (e.g., virtualization technology for directed I/O (Intel's VT-D)), effectively giving guests native access to only those peripheral devices. As should be apparent to one of ordinary skill in the art, a guest operating system (OS) can refer to different systems in different embodiments, such as a virtual machine running an OS with at least partial non-virtualized access to some hardware or machine state that the OS or hypervisor depends upon including BIOS, configuration, etc., that is not under the administrative control of the hosting provider. In other embodiments, the guest OS might refer to an OS that is not under the administrative control of the hosting provider running without full virtualization. In one embodiment, an MMU can logically connect a direct memory access (DMA)-capable I/O bus (e.g., a PCI bus) to main memory on a host, and can manage mapping of I/O devices to physical addresses to regulate the flow of information from a guest to various PCI or similar devices. These devices can include, for example, graphics processing unit (GPU) co-processors, high-performance NICs, disk controllers, or other "niche" co-processing devices, such as cryptographic cards or hardware codecs. In some embodiments, virtualization or other such technology can be used to provide a level of separation between guests and host machines from the central system hardware (e.g., CPU, memory, etc.), with native access potentially being available for specific devices on a given host. In other embodiments, native access can be provided to any hardware included in, or available for, a specific host. The electronic environment in such cases might include additional components and/or other arrangements, such as those illustrated in the configuration 200 of FIG. 2, discussed in detail below.

Figure 2:
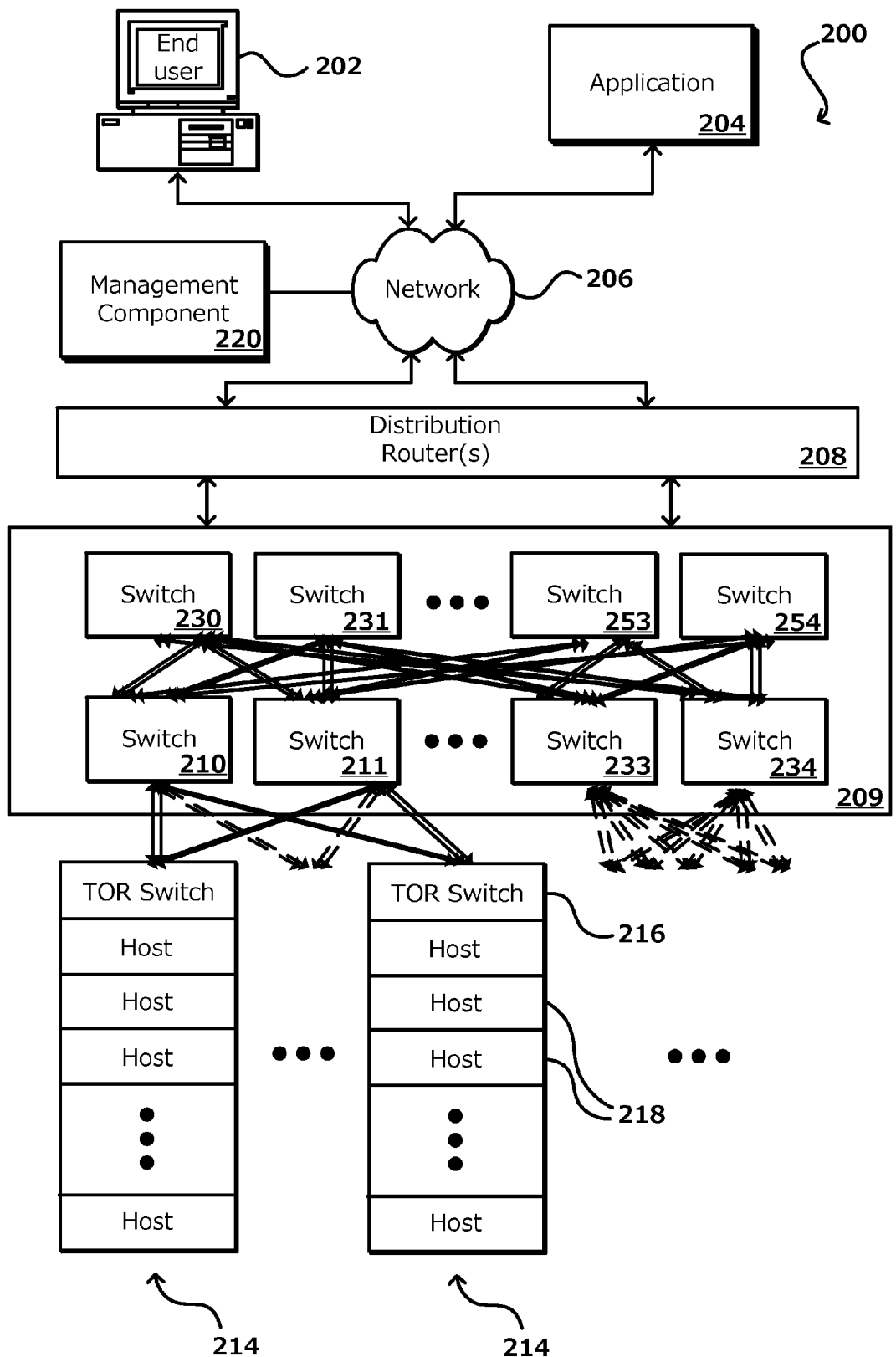
FIG. 2 illustrates an example of a highly connected network design that can be used in accordance with various embodiments.
Figure 3A:
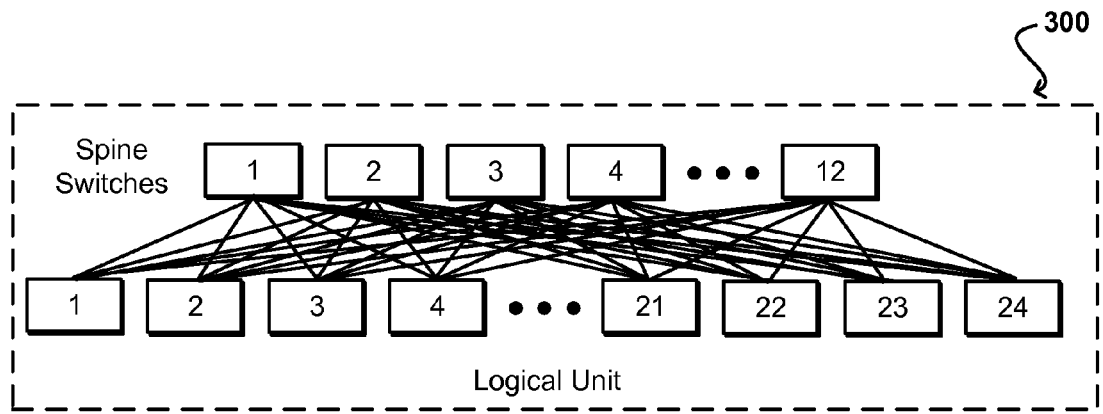
FIGS. 3A and 3B illustrate views of a logical unit of redundant switches that can be utilized in accordance with various embodiments.
Figure 3B:
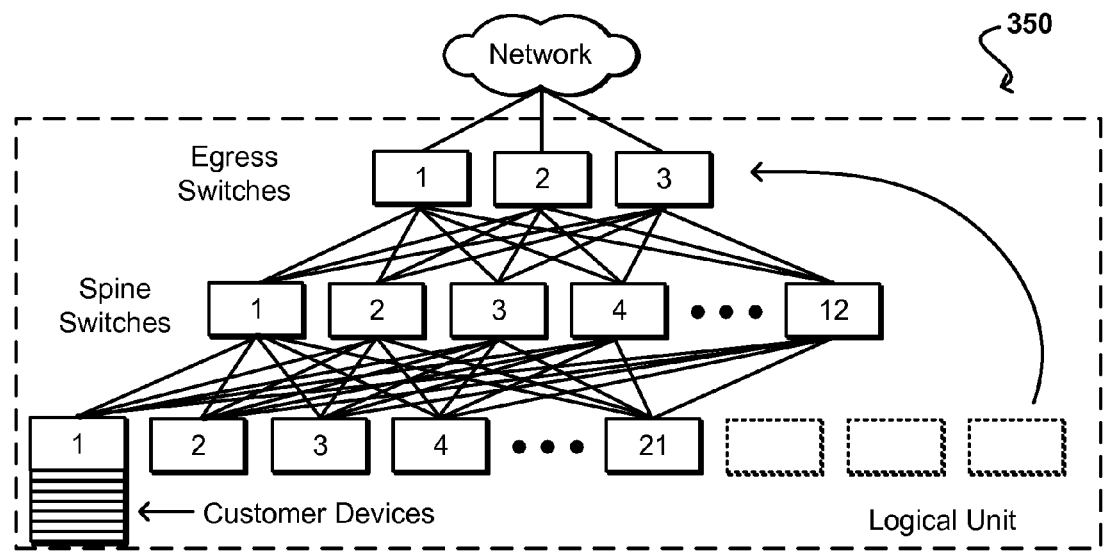

For example, FIG. 2 illustrates an example configuration 200 that represents a hierarchical network design that can be used to route requests to specific host machines or other such devices, in order to provide users or applications with access to a variety of distributed resources. This example shows a design that can be used for a data center, wherein a source such as an end user device 202 or application 204 is able to send requests across a network 206, such as the Internet, to be received by one or more components of a data center. Properties of various components of the network, such as provisioned instances, etc., can be managed using at least one management system, component, or service 220. Further, the management system, component, or service can be used to manage distribution of configuration information, configuration updates, OS images, authentication data, and/or other information to components, such as switches, routers, servers, or other devices in the data center. Further still, in addition to maintaining an authoritative repository of the network configuration, actions such as creating configuration information and/or configuration information update for a new switch or other device, uploading new configuration information to the switch, and/or maintaining historical versions of configuration information for all network devices can be managed by the management system. It should be noted that although FIG. 2 shows an example network architecture, the management system can be used to manage the distribution of configuration information or other information to any network. That is, the embodiments described herein are not restricted to any one network topology, and instead can advantageously be applied to any network topology organized in any number of hierarchical layers, where each layer can contain a multiplicity of switching devices that can route communication traffic between host devices or layers of other switching devices. Examples of such network topologies include Clos, butterfly, flattened butterfly, among others, an example of which is illustrated in FIGS. 3A-3B. It should be further noted that the management system can be provided as a service, where customers can utilize the management system to deploy configuration information, configuration updates, or other information to a customer's network.

In this example, the requests are received over the network to one of a plurality of distribution routers 208, but it should be understood that there can be any of a number of other components between the network and the distribution routers as known in the art, such as a management system component as described herein. As traditional differentiators have substantially disappeared, the terms "switch" and "router" can be used interchangeably. For purposes of clarity and explanation this document standardizes on the term "switch," but it should be understood this term as used also encompasses routers and other devices or components used for such purposes. Further, the switches can include any appropriate switch, such as a multilayer switch that operates at different levels in an OSI (Open System Interconnection) reference model.

Each distribution router is able to communicate with one or more groups of connected switches (herein also known as a logical unit of redundant switches). For example, as shown in FIG. 2, distribution router 208 communicates with a group of switches 209. In accordance with an embodiment, the group of switches can be organized in at least two layers of interconnected switches, where each layer can include any number of switches. In accordance with other embodiments, the group of switches can be organized in one or more layers, as may include two or more hierarchical, interconnected tiers of switches or other such arrangements, where each layer can contain a multiplicity of switching devices that can route communication traffic between host devices or layers of other switching devices, among other such options. For example, as shown in FIG. 2, a second layer includes switches 230, 231, 253, and 254, and a first layer includes switches 210, 211, 233, and 234. Each switch in the second layer is connected to the distribution router, e.g., as shown, switches 230, 231, 253, 254 in the second layer are connected to the distribution router 208. Also as shown in FIG. 2, each switch in a first layer is connected to each of the switches in the second layer. For example, switch 210 in the first layer is connected to switches 230, 231, 253, and 254 in the second layer. It should be noted that although each switch in the first layer of is connected to each switch in a second layer, other arrangements are possible, such as an arrangement where at least one switch in the first layer is connected to at least one switch in the second layer. It should be further noted that many other variations can be utilized as well within the scope of the various embodiments.

Each switch in the first layer 210, 211, 233, and 234 is linked to a plurality of physical racks 214, each of which typically contains a top of rack (TOR) or "access" switch 216 and a plurality of physical host machines 218, such as data servers and other processing devices. As shown, each switch in the first layer can be connected to a number of different racks, each with a number of host machines. In accordance with various embodiments, the links between the layers, switches, and/or components can each comprise redundant links, or link pairs, with separate links for inbound and outbound traffic. If the network utilizes redundant 1 Gigabit Ethernet (GbE) links, for example, the total bandwidth per redundant link is 2 GbE. It should be noted that in at least some instances the links between the layers, switches, and/or components include active network connections, while in other instances there can be links or other types of connections that operate to connect the switches and components for various purposes. An active network connection has network traffic, or other such data, flowing across the connection to be transmitted between the two network devices or other such components connected by the active network connection. In some embodiments, such as high radix interconnection networks utilized for high-performance computing (HPC) or other such purposes, each physical rack can contain multiple switches. Instead of a single physical TOR switch connecting thirty-six hosts in a physical rack, for example, each of three switches in the rack can act as a local TOR switch for a "logical" rack (a sub-rack of a physical rack or logical grouping of devices (hosts and/or switches) from multiple racks), with each local TOR switch connecting twelve of the host machines. The logical racks can be implemented using physical or wireless switches in different embodiments. In some embodiments each of these switches within a high performance computing rack manages up to twelve servers, but the number can vary depending on factors such as the number of ports on each switch. For example, if a switch contains twenty-four ports, half of those ports typically will be host-facing and the other half will face the external network. A design in accordance with one embodiment could utilize seven racks with three switches in each, with each local TOR switch communicating (redundantly) with twelve servers, which would generally be equivalent to twenty-one separate racks each with a single TOR switch communicating with twelve servers, for example. In subsequent figures and description, it should be understood that physical or logical racks can be used within the scope of the various embodiments.

In accordance with an embodiment, each switch in the first layer and each switch in the second layer can include one or more configuration files, versions or information, such as a running/operation configuration and a startup configuration. In other embodiments, each switch in the group of switches can include one or multiple configurations (such as three of more). When updating the configuration of a switch in the group of switches, the management system completely (and in some instances partially) copies the new configuration to the switch's startup configuration, and when the switch reboots, the switch reads the new configuration from the startup configuration, which is then used as the running/operation configuration.

When updating the configuration of a switch in the group of switches, the management system can perform a number of checks to ensure that applying a configuration to one or more switches will not disrupt network traffic to any one set of host machines. For example, before taking a switch offline such that network traffic is diverted from the switch, the management system determines that there is no single-homed TOR switch connected to a switch in the group of switches and that there will be no single-homed TOR as a result of taking offline the switch, the health of an updated switch (e.g., that the switch is currently functioning properly by delivering/receiving network traffic), and whether, e.g., each switch in a second layer is connected to at least two switches in a first layer in a two layer architecture. In accordance with an embodiment, a single-homed rack is connected to a TOR switch where only one uplink is active, and if the switch to which the TOR switch is connected gets rebooted, it would completely cut-off network connectivity for the rack (and for the customers on the rack). In accordance with various other embodiments embodiment, in a multilayer architecture, each switch in each layer is connected to at least two other switches in adjacent layers. For example, in an architecture having three layers of interconnected switches, each switch in the second layer is connected to at least two switches in the first and third layer.

In accordance with various other embodiments, the management system can determine the health of a switch in the group of switches by performing any one of sanity and/or validation testing of a switch before, during, and/or after configuration update of the switch. In accordance with an embodiment, a sanity test is a basic test to quickly evaluate the validity of a particular function of a computer program, switch, calculation, or other analysis to ensure that a switch or other component will work as expected. A sanity test will determine whether, for example, a service or component of an operating system or configuration is in place, or whether the switch includes an appropriate number of uplinks, connections, etc., to other switches and/or components. A validation test is generally understood to be a more advanced type of test to determine whether functional elements of an operating system, configuration, or application work as expected. For example, whether a switch is operating within a determined range of functional values, measured by, e.g., the successful delivery or receipt of network traffic, a successful login to an operating system, or the creation of a new entity in a database with success, can be validation tests.

Once these checks pass (e.g., each TOR switch is connected to at least two switches in the group of switches), the management system proceeds with shifting traffic away from the switch, applying configuration changes to the switch, and then rebooting the switch. Thereafter, the management system validates the health of the updated switch, shifts traffic back to the switch, and moves on to the next switch in the group of switches to update the configuration of the next switch until each switch receives a configuration update.

As described above, the management system can be used to manage the distribution of configuration information or other information over any network topology or interconnected devices, including traditional hierarchical aggregation pair networks using large/expensive routers or high radix aggregation fabrics (also known as Fat Tree, Constant Bisectional Bandwidth and Clos networks) using, for example, high-throughput commodity switches (i.e., inexpensive switches with small buffers relative to aggregate bandwidth). For example, FIGS. 3A and 3B illustrate a design based on a Clos network approach, wherein there are twenty-one racks each with at least one TOR switch (actual or local), and each of the TOR switches is connected to an array of twelve spine switches, which typically will be located in another physical rack. The array of spine switches corresponds to a "center" stage in a traditional Clos network design. Since there are twelve hosts, there are twelve "up" connections and twelve "down" connections to the spine switches. The design thus provides a high radix network based on a re-arrangeably non-blocking Clos network.

The design presented illustrates one possible arrangement, here a two-tier folded Clos network. As seen in the configuration 300 of FIG. 3A, there are effectively two layers of switches: a layer of spine switches and a layer of edge switches, each of which can be updated in accordance with embodiments described herein. Three of the edge switches, however, can be utilized as egress switches which pass data on to the network. FIG. 3B thus illustrates a logical arrangement 350 of the switches, herein referred to as a "logical unit," showing the three edge switches as egress switches which sit at the "top" of the group of switches and pass data "up and out" of the logical unit. Each of the twelve spine switches can be thought of as having a port out the logical "back" side to one of the three egress switches, but the three switches are simply one of the twenty-four edge servers illustrated in a folded representation. The egress switches simply have the only connections out of the logical unit, while the remaining edge switches have connections to underlying devices. All traffic into and out of the logical unit thus is routed through one of the three egress switches, although different numbers of switches can be used in different embodiments.

Even though the network may appear similar to the design of FIG. 2, the spine switches in this design function as core switches, but do not have any outbound connectivity. The layers of the logical unit have fully meshed connectivity, however, provided by the spine switches. The logical unit without the egress switches would function as a standalone network without any external connectivity. Thus, some of the edge switches can be utilized as egress switches as illustrated. Otherwise, the fact that some of the edge switches are illustrated on the top layer and some on the bottom layer is meaningless from a network connectivity perspective with respect to the spine switches and the other edge switches, and there is very symmetric behavior. The data within the logical unit can be pushed through a number of equidistant, fault-tolerant paths, providing the re-arrangably non-blocking behavior. With the paths being symmetric and equidistant, all the switches can follow the same routing protocol and spread the traffic evenly without a lot of overhead or additional logic. Further, the logical units can be replicated multiple times within a data center, for example, wherein a Clos-style network effectively manages traffic across all of the logical units in the data center.

Figure 4:
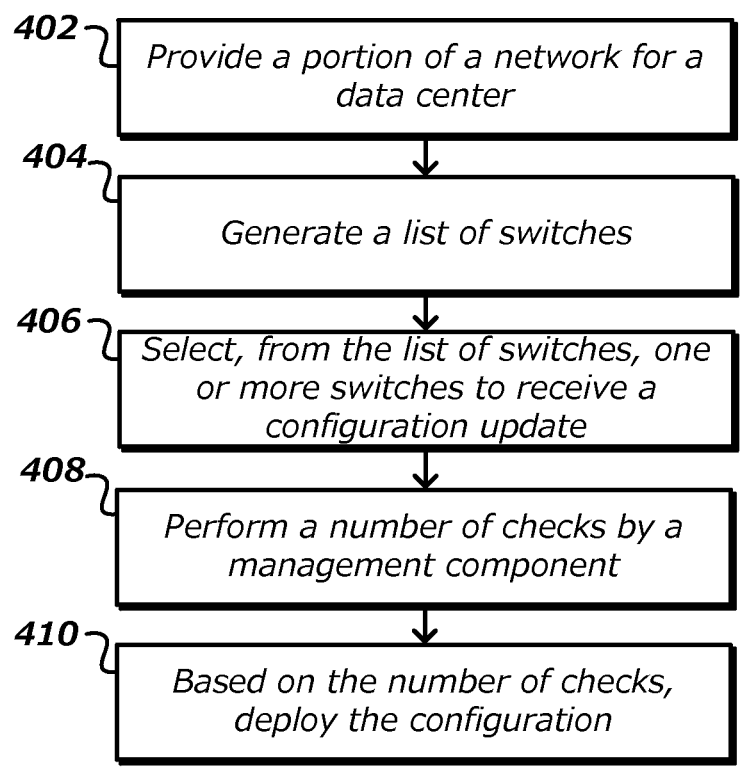
FIG. 4 illustrates an example process for managing configuration deployments that can be used in accordance with one embodiment.
Figure 5:
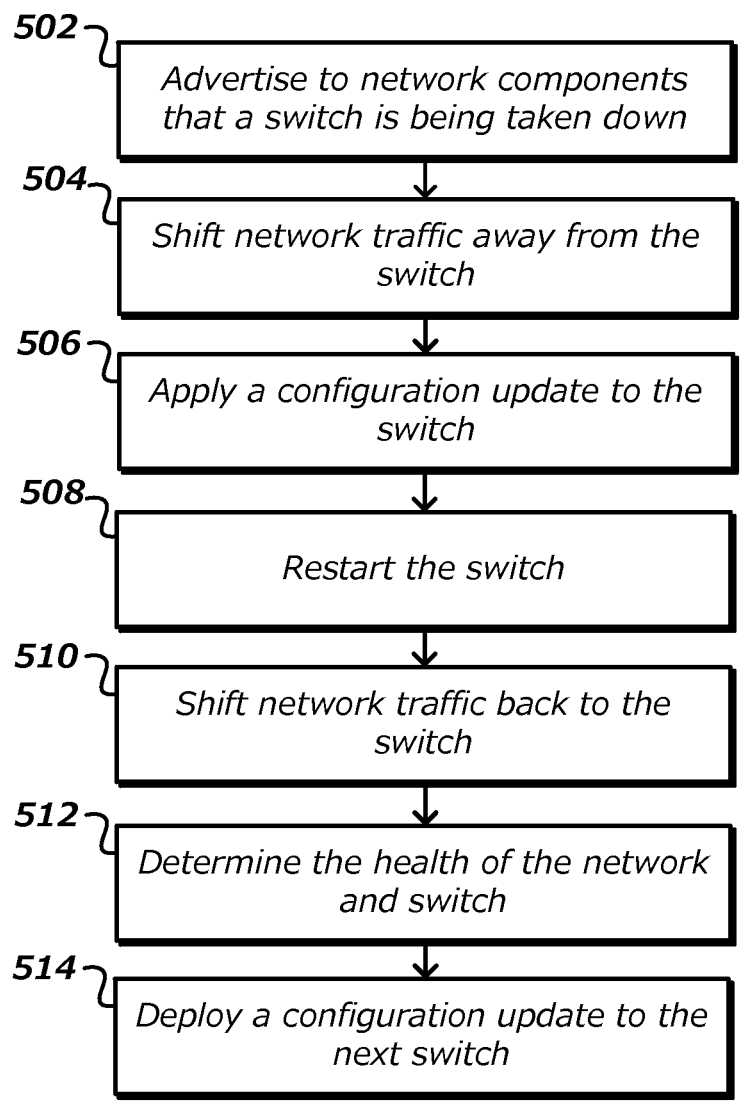
FIG. 5 illustrates an example process for managing configuration deployments that can be used in accordance with an additional embodiment.

FIGS. 4 and 5 illustrate an example of a process for deploying configuration changes to multiple switches in a data center or other such environment that can be utilized in accordance with one embodiment. As will be described further, FIG. 4 illustrates an example process for initiating deployments to selected switches in a group of connected switches, and FIG. 5 illustrates an example process for updating the configuration of the selected switches. It should be understood that, for any process described herein, that there can be additional or fewer steps performed in similar or alternative orders, or in parallel, within the scope of the various embodiments unless otherwise stated. It should be noted that the embodiments described herein are not restricted to any one network topology, and instead can advantageously be applied to any network topology organized in any number of hierarchical layers, where each layer can contain a multiplicity of switching devices that can route communication traffic between host devices or layers of other switching devices. As described in FIG. 4, a portion of a network for a data center is provided 402, such as by providing at least one group of connected switches and a plurality of racks or other groupings that each include (or have assigned) a commodity TOR switch. As described in FIG. 2, the group of switches can be organized in at least two layers, where each switch in a first layer can be connected to at least one switch in a second layer, each switch in the second layer can be connected to a network, and each switch in the first layer can be connected to at least one of the plurality of racks. In other embodiments, the group of switches can be organized in any number of hierarchical layers (or only one layer), where each layer can contain a multiplicity of switching devices that can route communication traffic between host devices or layers of other switching devices. In any situation, the links between the TOR switches to e.g., the switches in the first layer, and between the switches in the first layer and the switches in the second layer, can each comprise redundant links, or link pairs, with separate links for inbound and outbound traffic.

Once the switches are connected, a management system for the data center receives a request to generate 404 a list of switches that constitute the group of switches, and from the list of switches, one or more switches are selected 406 to receive a configuration update. For example, configuration information, configuration information updates, and/or other information can be deployed to an individual switch, a specific set of switches, to all switches except ignored switches, to all switches expect switches connected by particular links, among others. Upon determining the switches to receive the configuration update, the management system performs a number of checks to determine 408 the health of the group of switches, such as by determining whether each switch in the first layer is connected to an expected number of switches in the second layer (e.g., one or all of the switches in the second layer). For example, in accordance with an embodiment, when a switch in the first layer is not connected to a predetermined number of switches in the second layer (e.g., at least two switches in the second layer), configuration for the selected switch fails, and the configuration is aborted. Additionally, when determining the health of the group of switches, the management system can determine 408 whether any of the host machines connected to the group of switches is connected to only a single switch in the first layer of switches and that there will be no single-homed TOR as a result of taking offline the switch. In accordance with an embodiment, a configuration scheduled for a switch attached to a single homed TOR switch fails, and the configuration for the switch is aborted. Thereafter, based on the results, a list of switches available for configuration deployment can be determined.

Upon determining the switches to which a configuration update can be deployed, the management system deploys 410 the configuration update to those switches. For example, FIG. 5 describes a process in which a configuration update is deployed to at least one switch in a group of connected switches, such as to each switch identified in FIG. 2. Although this process describes deploying a configuration update to the selected switches sequentially, in various other embodiments, the configuration can be deployed to two or more switches concurrently.

In some embodiments, taking a switch randomly out of service to update the switch's configuration can cause the network to partition or decrease routing efficiency, which can potentially cause large scale impacts. For example, changes to interface IP addresses, which form a large class of deployments, need to be carefully orchestrated in order to prevent inconsistency in the network. Accordingly, in various embodiments, there may be a strict order in which configuration changes are deployed to switches. In other embodiments, the deployment plan can allow for the concurrent deployment of a configuration update to multiple switches. In any situation, the first switch in the group of switches that is to receive a configuration update is checked to verify the health of the switch. If the health of the switch is acceptable, the configuration update can proceed. In some embodiments, a switch can be determined to be healthy when each TOR switch, connected to the switch, is connected (i.e., has an active network connection) to at least two other switches, such that there will be no single-homed TOR switch as a result of taking the switch offline. In the situation of a single-home TOR switch, at least one other active network connection to another switch in the group of switches can be automatically initiated.

In response to determining that the health of the first switch is acceptable, the switch advertises 502 to each TOR switch to which it is connected, and to each switch in the group of switches, that it is going out of service. The management system then shifts 504 network traffic from the first switch to at least one other switch, disconnects the active network connection between the first switch and any network component connected thereto, and the new configuration is applied 506 to a startup configuration or other configuration of the first switch, without affecting the run-time state of the switch. When the first switch restarts 508, the startup configuration is read, applied, and used as the operation configuration. It should be noted that in other embodiments, a switch may include only one configuration file. In this instance, upon shifting network traffic from the switch, the new configuration can be loaded onto the switch, e.g., into persistent memory of the switch. When the switch reloads, the configuration is read from the persistent memory, applied, and used as the current configuration.

Thereafter, upon initiating a new active network connection between the first switch at least one other switch in the group of switches and/or a TOR switch, the management system shifts 510 network traffic back to the first switch, and determines 508 the health of the group of switches and the health of the first switch (e.g., by determining whether the first switch is receiving and communicating network traffic, is connected to an expected number of other switches in the group of switches and/or devices, and passes one or more validation and/or sanity tests). For example, the management system can determine the health of the group of switches by determining whether each switch in the first layer is connected to an expected number of switches in the second layer, and whether there are any single homed TOR switches connected to switches in the first layer. In accordance with an embodiment, for example, each switch in the first layer is connected to each switch in the second layer, and each TOR switch is connected to at least two switches in the first layer when the group of switches is healthy.

In yet other embodiments, the management system can determine the health of the group of switches by obtaining a snapshot of the network topology before the configuration update and after the configuration update, and comparing the first snapshot and the second snapshot to determine any changes in the network topology. In accordance with an embodiment, changes can include inconsistent connections between layers, switches and/or other components, unexpected or no network traffic at one or more switches and/or devices, inoperable switch, and/or device, among others.

In accordance with an embodiment, based at least in part on the changes, the management system can roll back the configuration update of the switch to a previous and/or different version, automatically adjust the network to correct for the changes, or do nothing. For example, in accordance with an embodiment, the management system can maintain a transaction, database, audit trail, or any other log that maintains a history of actions executed by the management system, such as a history of configuration versions for each switch. The history of configuration versions can be used to guarantee configuration settings over crashes, aborted configuration updates, or hardware failures. The log can be maintained in a database or on each switch. Thus, in accordance with an embodiment, if, after a configuration update, a switch or other device is found in an inconsistent state, the management system can review the database logs for previous configurations and can roll back the changes made by these transactions by replacing the current running configuration with any saved configuration file to revert to a previous configuration state.

In accordance with various embodiments, automatically adjusting the network can include setting connections between switches, devices, and/or layers to ensure that each switch in the first layer is connected to an expected number of switches in the second layer, that each switch in the second layer is connected to an expected number of switches in the first layer, and that there are no single homed TOR switches attached to switches in the first layer. This provides for a management system that can detect deviations from expected topology and configuration, audit and tack changes to a network, recover from network errors without user intervention Upon verifying the health of the group of switches, the management system deploys 514 an update to the next switch of the selected switches until each switch is updated. For example, after applying the update to the configuration of the first switch, a request to update the configuration of a second switch in the group of switches is received. Alternatively, the configuration process can automatically begin for the next switch in the group of switches selected to receive the update (i.e., the group of switches determined in step 406 of FIG. 4) upon updating the first switch. In this example, an active network connection is detected between the second switch and a second TOR switch, and if the active network connection is the only active network connection to the second TOR switch, an active network connection between the second TOR switch and at least one other switch is initiated in order to provide redundancy and ensure that data being transmitted to or from the second TOR switch is not lost when the second switch is being configured. In response to initiating the active network connection, all network traffic is routed away from the second switch and the update is applied to the configuration of the second switch.

It should be noted that although a single active deployment was described, multiple deployments can be scheduled and executed at any given time. For example, in certain embodiments the configuration updates are deployed sequential to each switch in the group switches, while in other embodiments, the configurations can be deployed concurrently to each switch in the group of switches. In any situation, as described above, the management system continually verifies that individual TOR switches are connected to at least two switches in the first layer not selected to receive the configuration update, and that each switch in the first layer is connected to each switch in the second layer before a configuration update begins. It should be further noted that deployment of configuration updates is not limited to the arrangement of switches described, but can apply to any device in any local or remote network. Further still, the management system described herein can be operated and used as a service that is remotely accessed, or can be used as a drop-in component to an existing network, such that a customer can implement the teachings described herein to deploy configuration updates and/or other information in their network.

Figure 6:
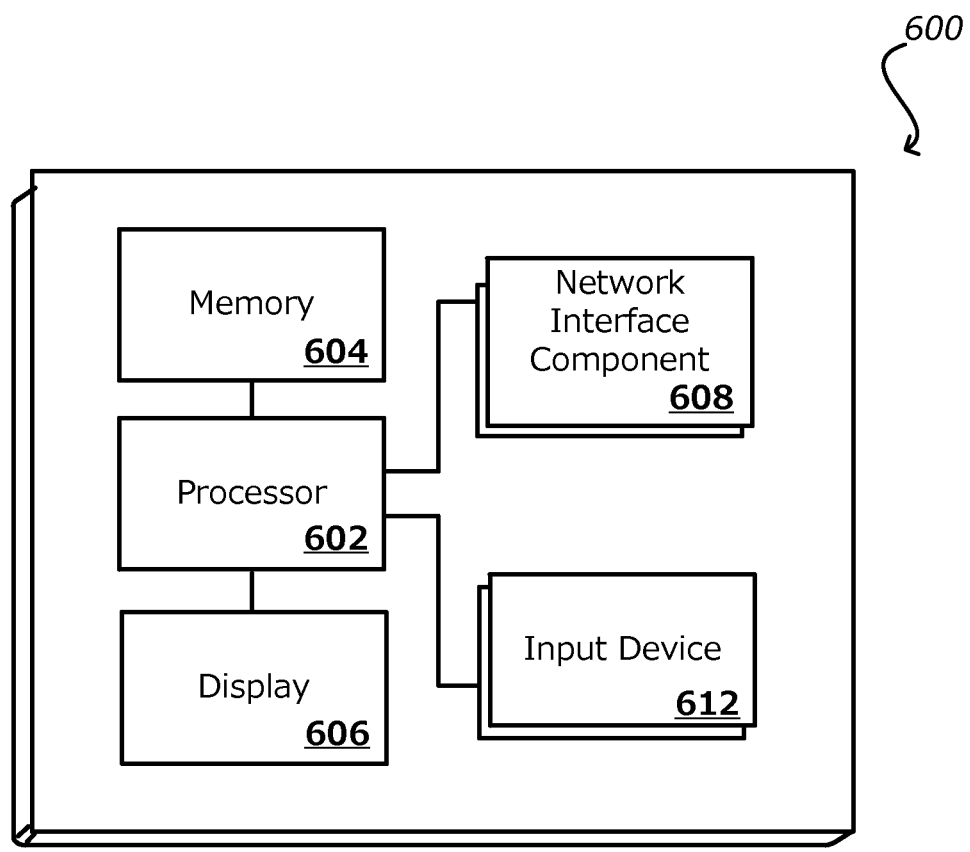
FIG. 6 illustrates a logical arrangement of a set of general components of an example computing device that can be utilized in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 608 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of providing configuration updates to switches in a data center, comprising:
   receiving a request to a management component for a data center, the data center including a group of connected switches and one or more host machines associated with the group of connected switches, the group of connected switches organized in at least two layers, each switch in a first layer of the at least two layers being connected to each switch in a second layer of the at least two layers, each switch in the second layer of the at least two layers connected to a network, and each switch in the first layer of the at least two layers connected to at least a portion of the one or more host machines;
   determining, based at least in part on information associated with the request, at least one switch in the group of connected switches to receive a configuration update, the at least one switch being coupled to a first host machine of the one or more host machines via a first active network connection;
   verifying that the first host machine is coupled to at least two switches in the first layer via a second active network connection based at least in part on a first snapshot of a network topology of the first active network connection and the second active network connection;
   shifting network traffic away from the at least one switch;
   applying the configuration update to the at least one switch;
   validating the configuration update by determining whether the at least one switch operates within a determined range of functional values;
   obtaining a second snapshot of the network topology of at least the first active network connection and the second active network connection after the configuration update; and
   shifting network traffic to the at least one switch based at least in part on a comparison of the first snapshot and the second snapshot.

2. The computer-implemented method of claim 1, further comprising:
   generating a list of switches that constitute the group of connected switches;
   selecting one or more switches from the list of switches to receive the configuration update; and applying the configuration update to the selected one or more switches concurrently, wherein applying the configuration update does not disrupt network traffic.

3. The computer-implemented method of claim 1, wherein the management component is configured to perform at least one of: execute one or more checks to verify a state of a switch, deactivate the switch, shift traffic to and from the switch, apply configuration information to the switch, verify the switch's state upon applying the configuration information, or reboot the switch.

4. A computer-implemented method, comprising:
receiving a request to update a configuration of a first switch, the first switch having a first active network connection with a first computing device, the first switch being in a logical unit of redundant switches, the logical unit of redundant switches including at least two interconnected layers of switches, a first layer of the at least two interconnected layers of switches being connected to a set of one or more host machines, and a second layer of the at least two interconnected layers being connected to a network;
determining that the first computing device does not have a second active network connection to one or more other switches in the logical unit of redundant switches;
initiating a second active network connection between a second switch in the logical unit of redundant switches and the first computing device based at least in part on a first snapshot of network topology of the first active network connection and the second active network connection;
shifting network traffic away from the first switch;
disconnecting the first active network connection;
applying the update to modify the configuration of the first switch;
performing one or more tests;
obtaining a second snapshot of the network topology of the first active network connection and the second active network connection;
shifting network traffic back to the first switch based at least in part on a comparison of the first snapshot and the second snapshot; and
prior to at least one of shifting network traffic away from the first switch or shifting traffic to the first switch:
determining whether at least one network component referenced by the first switch is available; and
validating the first switch by determining whether the first switch operates within a determined range of functional values.

5. The computer-implemented method of claim 4, further comprising:
initiating, after applying the update to the configuration of the first switch, a new active network connection between the first switch and at least one of the first computing device or at least one other computing device.

6. The computer-implemented method of claim 4, wherein the first switch and the second switch are in a same network layer of a data center.

7. The computer-implemented method of claim 4, further comprising:
receiving a request to update a configuration of the second switch;
detecting a third active network connection between the second switch and a second computing device;
determining if the third active network connection is an only active network connection to the second computing device;
in response to determining that the third active network connection is the only active network connection to the second computing device, initiating a fourth active network connection between the second computing device and at least one other switch, disconnecting the third active network connection, and applying the update to the configuration of the second switch; and
in response to determining that the third active network connection is not the only active network connection to the second computing device, disconnecting the third active network connection and applying the update to the configuration of the second switch.

8. The computer-implemented method of claim 4, wherein the first computing device is a network switch.

9. The computer-implemented method of claim 7, wherein applying the update to the configuration of the second switch happens after applying the configuration update to the first switch has completed.

10. The computer-implemented method of claim 4, wherein the first computing device is a host machine.

11. The computer-implemented method of claim 4, wherein the first snapshot comprises the network topology of the logical unit of redundant switches before applying the update to the configuration of the first switch, wherein the second snapshot of the network topology of the logical unit of redundant switches after applying the update to the configuration of the first switch, the method further comprising:
in response to comparing the first snapshot to the second snapshot, performing at least one of: adjusting connections between the logical unit of redundant switches, rolling back the configuration of the first switch, or reapplying the update to the configuration of the first switch.

12. A system, comprising:
a first network switch in a layer of network switches, the first network switch having a first configuration;
a second network switch in the layer of network switches, the second network switch having a second configuration;
a set of one or more computing devices, a first computing device of the set of one or more computing devices connected to the first network switch using a first active network connection, a second computing device of the set of one or more computing devices connected to the second network switch using a second active network connection;
a processor; and
memory including instructions that, when executed by the processor, cause a management component to update the first configuration of the first network switch and the second configuration of the second network switch, wherein updating the first configuration and the second configuration comprises:
verifying at least two active network connections to the first computing device based at least in part on a first snapshot of network topology of the first active network connection and the second active network connection,
shifting network traffic away from the first network switch,
updating the first configuration,
verifying at least two active network connections to the second computing device,
shifting network traffic away from the second network switch,
updating the second configuration, validating the first configuration and the second configuration by determining whether the first network switch and the second network switch operates within a determined range of functional values, obtaining a second snapshot of at least the first active network connection and the second active network connection after updating the first configuration and the second configuration, and shifting network traffic back to the first network switch and the second network switch based at least in part on a comparison of the first snapshot and the second snapshot.

13. The system of claim 12, wherein an active network connection has data flowing across the active network connection to be transmitted between at least two network switches connected by the active network connection.

14. The system of claim 12, wherein the set of one or more computing devices includes at least one of a network switch or a host machine.

15. The system of claim 12, wherein the first network switch is in a logical unit of switches, the logical unit of switches comprising at least two interconnected layers of switches.

16. The system of claim 15, wherein the first snapshot of comprises the network topology of the logical unit of switches before applying the update to the first configuration of the first network switch and the second configuration of the second network switch;

wherein the second snapshot comprises the network topology of the logical unit of switches after applying the update to the first configuration of the first network switch and the second configuration of the second network switch; and performing, based at least in part on a comparison of the first snapshot and the second snapshot, at least one of: adjusting connections between the logical unit of switches, rolling back the first configuration of the first network switch, rolling back the second configuration of the second network switch, reapplying the update to the second configuration of the second network switch, or reapplying the update to the first configuration of the first network switch.

17. A non-transitory computer readable storage medium storing one or more sequences of instructions executable by one or more processors to perform a set of operations comprising:

determining that a configuration of at least one specified switch is to be updated, the at least one specified switch positioned in at least one layer of a logical unit of switches;

verifying, before updating the configuration of the at least one specified switch, that each switch in the logical unit of switches, having a first active network connection to one of the at least one specified switch, also has a second active network connection to at least one other switch in the logical unit of network switches, the verifying based at least in part on a first snapshot of a network topology of the first active network connection and the second active network connection;

applying a configuration update to the at least one specified switch;

prior to at least shifting network traffic away from the at least one specified switch or shifting traffic back to the at least one specified switch:

determining whether at least one network component referenced by the at least one specified switch is available; and determining whether the at least one specified switch operates within a determined range of functional values;

obtaining a second snapshot of the network topology of at least the first active network connection and the second active network connection after the configuration update; and shifting network traffic to the at least one specified switch based at least in part on a comparison of the first snapshot and the second snapshot.

18. The computer readable storage medium of claim 17, wherein applying the configuration update to the at least one specified switch further comprises:

shifting network traffic away from the at least one specified switch;

applying the configuration update to the at least one specified switch; and shifting network traffic back to the at least one specified switch after the configuration update has been applied to the at least one specified switch.

19. The computer readable storage medium of claim 17, further comprising instructions executed by the one or more processors to perform the operations of:

obtaining a first snapshot of a network topology of the logical unit of switches before applying the configuration update to the at least one specified switch;

obtaining a second snapshot of the network topology of the logical unit of switches after applying the configuration update to the at least one specified switch; and in response to comparing the first snapshot to the second snapshot, performing at least one of: adjusting connections between the logical unit of switches or reapplying the configuration update to the at least one specified switch.

20. The computer readable storage medium of claim 17, further comprising instructions executed by the one or more processors to perform the operations of:

maintaining a log of a history of configuration versions for each switch in the logical unit of switches; and in response to aborting a configuration update for one of the switches in the logical unit of switches, applying a most recent configuration update to the one of the switches in the logical unit of switches based at least in part on the log.

21. The computer-implemented method of claim 1, wherein determining whether the first switch operates within the determined range of functional values comprises validating based at least on a successful login to an operating system.

22. The computer-implemented method of claim 4, wherein determining whether the first switch operates within the determined range of functional values comprises validating based at least on a successful login to an operating system.

23. The system of claim 12, wherein determining whether the first switch operates within the determined range of functional values comprises validating based at least on a successful login to an operating system.

24. The computer readable storage medium of claim 17, wherein determining whether the first switch operates within the determined range of functional values comprises validating based at least on a successful login to an operating system.

* * * * *